(12) United States Patent
Lin et al.

(10) Patent No.: US 11,861,364 B2
(45) Date of Patent: Jan. 2, 2024

(54) CIRCULAR SHADOW STACK IN AUDIT MODE

(71) Applicant: Microsoft Technology Licensing, LLC, Redmond, WA (US)

(72) Inventors: Jin Lin, Seattle, WA (US); Mehmet Iyigun, Kirkland, WA (US); Jason Lin, Bellevue, WA (US); Matthew John Woolman, Seattle, WA (US)

( * ) Notice: Subject to any disclaimer, the term of this patent is extended or adjusted under 35 U.S.C. 154(b) by 139 days.

(21) Appl. No.: 17/352,283

(22) Filed: Jun. 19, 2021

(65) Prior Publication Data

US 2021/0311740 A1    Oct. 7, 2021

Related U.S. Application Data

(63) Continuation-in-part of application No. 16/945,458, filed on Jul. 31, 2020, now Pat. No. 11,500,981, and (Continued)

(51) Int. Cl.
| | |
|---|---|
| *G06F 21/00* | (2013.01) |
| *G06F 9/30* | (2018.01) |
| *G06F 9/50* | (2006.01) |
| *G06F 9/38* | (2018.01) |
| *G06F 21/54* | (2013.01) |
| *G06F 21/52* | (2013.01) |
| *G06F 21/56* | (2013.01) |

(52) U.S. Cl.
CPC ........ *G06F 9/30116* (2013.01); *G06F 9/3009* (2013.01); *G06F 9/30134* (2013.01); *G06F 9/3806* (2013.01); *G06F 9/5016* (2013.01); *G06F 21/52* (2013.01); *G06F 21/54* (2013.01); *G06F 21/566* (2013.01)

(58) Field of Classification Search
None
See application file for complete search history.

(56) References Cited

U.S. PATENT DOCUMENTS

| 8,510,596 B1 * | 8/2013 | Gupta | ..................... G06F 21/56 |
| | | | 714/21 |
| 11,379,579 B2 | 7/2022 | Lin et al. | |

(Continued)

OTHER PUBLICATIONS

Zhou, Jingyu; Vigna, Giovanni. Detecting attacks that exploit application-logic errors through application-level auditing. 20th Annual Computer Security Applications Conference. https://ieeexplore.ieee.org/stamp/stamp.jsp?tp=&arnumber=1377227 (Year: 2004).*

(Continued)

*Primary Examiner* — Jeremiah L Avery
(74) *Attorney, Agent, or Firm* — Workman Nydegger

(57) ABSTRACT

Performing shadow stack functionality for a thread in an audit mode includes initiating execution of a thread at the processor. Execution of the thread includes initiating execution of executable code of an application binary as part of the thread and enabling shadow stack functionality for the thread in an audit mode. Based at least on the execution of the thread in the audit mode, at least a portion of the shadow stack is enabled to be a circular stack. In response to determining that usage of the shadow stack has reached the defined threshold, one or more currently used entries of the shadow stack are overwritten, preventing the shadow stack from overflowing.

19 Claims, 9 Drawing Sheets

Related U.S. Application Data a continuation-in-part of application No. 16/828,089, filed on Mar. 24, 2020, now Pat. No. 11,379,579.

(56) References Cited

U.S. PATENT DOCUMENTS

| | | | | |
|---|---|---|---|---|
| 11,574,429 | B1* | 2/2023 | Tam | G06F 40/106 |
| 2005/0010804 | A1* | 1/2005 | Bruening | G06F 21/52 |
| | | | | 726/1 |
| 2007/0192576 | A1* | 8/2007 | Moore | G06F 7/785 |
| | | | | 712/242 |
| 2009/0320129 | A1 | 12/2009 | Pan et al. | |
| 2015/0356294 | A1* | 12/2015 | Tan | G06F 21/53 |
| | | | | 726/22 |
| 2016/0092673 | A1* | 3/2016 | LeMay | G06F 21/52 |
| | | | | 718/1 |
| 2017/0228535 | A1* | 8/2017 | Shanbhogue | G06F 3/0673 |
| 2019/0306282 | A1* | 10/2019 | Masputra | H04L 47/193 |
| 2020/0125770 | A1* | 4/2020 | LeMay | G06F 9/48 |
| 2020/0159888 | A1* | 5/2020 | Ghose | G06F 9/3842 |
| 2021/0200546 | A1* | 7/2021 | Lemay | G06F 9/45558 |
| 2021/0303680 | A1 | 9/2021 | Lin et al. | |
| 2021/0303681 | A1 | 9/2021 | Lin et al. | |

OTHER PUBLICATIONS

Shi, Weidong et al. InfoShield: a security architecture for protecting information usage in memory. The Twelfth International Symposium on High-Performance Computer Architecture, 2006. https://ieeexplore.ieee.org/stamp/stamp.jsp?tp=&arnumber=1598131 (Year: 2006).*

"International Search Report and Written Opinion Issued in PCT Application No. PCT/US2021/015349", dated Apr. 22, 2021, 13 Pages.

"International Search Report and Written Opinion Issued in PCT Application No. PCT/US2021/015973", dated Apr. 26, 2021, 14 Pages.

Zhang, et al., "JITScope: Protecting Web Users from Control-Flow Hijacking Attacks", In Proceedings of IEEE Conference on Computer Communications, Apr. 26, 2015, pp. 567-575.

"Notice of Allowance Issued in U.S. Appl. No. 16/945,458", dated Jul. 13, 2022, 12 Pages.

Bresch, et al., "Stack Redundancy to Thwart Return Oriented Programming in Embedded Systems", In Journal of IEEE Embedded Systems Letters, vol. 10, Issue 3, Sep. 2018, pp. 87-90.

Burow, et al., "SoK: Shining Light on Shadow Stacks", In Proceedings of IEEE Symposium on Security and Privacy, May 19, 2019, pp. 985-999.

Panis, et al., "Scaleable Shadow Stack for a Configurable DSP Concept", In Proceedings of the 3rd IEEE International Workshop on System-on-Chip for Real-Time Applications, Jul. 2, 2003, 6 Pages.

"International Search Report and Written Opinion Issued in PCT Application No. PCT/US22/028891", dated Jul. 20, 2022, 11 Pages.

"Multiple Chinese Threat Groups Exploiting CVE-2018-0798 Equation Editor Vulnerability Since Late 2018", Retreived From: https://www.anomali.com/blog/multiple-chinese-threat-groups-exploiting-cve-2018-0798-equation-editor-vulnerability-since-late-2018, Jul. 3, 2019, 10 Pages.

Branscombe, Mary, "Windows 10 Security: How the Shadow Stack Will Help to Keep the Hackers At Bay", Retrieved From: https://www.techrepublic.com/article/windows-10-security-how-the-shadow-stack-will-help-to-keep-the-hackers-at-bay/, Apr. 3, 2020, 7 Pages.

Bridge, et al., "PE Format", Retrieved From: https://docs.microsoft.com/en-us/windows/win32/debug/pe-format#extended-dll-characteristics, Aug. 11, 2020, 57 Pages.

Pulapaka, Hari, "Understanding Hardware-enforced Stack Protection", Retrieved From: https://techcommunity.microsoft.com/t5/windows-kernel-internals/understanding-hardware-enforced-stack-protection/ba-p/1247815, Mar. 24, 2020, 6 Pages.

Robertson, et al., "/CETCOMPAT (CET Shadow Stack Compatible)", Retrieved From: https://docs.microsoft.com/en-us/cpp/build/reference/cetcompat?view=msvc-160&viewFallbackFrom=vs-2019, Sep. 1, 2020, 3 Pages.

Robertson, et al., "/NXCOMPAT (Compatible with Data Execution Prevention)", Retrieved From: https://docs.microsoft.com/en-us/cpp/build/reference/nxcompat-compatible-with-data-execution-prevention?view=msvc-160&viewFallbackFrom=vs-2019, Dec. 17, 2019, 2 Pages.

Swiat, "Eternal Champion Exploit Analysis", Retrieved From: https://msrc-blog.microsoft.com/2017/06/29/eternal-champion-exploit-analysis/, Jun. 29, 2017, 13 Pages.

"Notice of Allowance Issued in U.S. Appl. No. 16/828,089", dated Mar. 8, 2022, 10 Pages.

Ge, et al., "Fine-Grained Control-Flow Integrity for Kernel Software", In proceedings of IEEE European Symposium on Security and Privacy, Mar. 21, 2016, 16 Pages.

Skadron, et al., "Improving Prediction for Procedure Returns with Return-Address-Stack Repair Mechanisms", In Proceedings of 31st Annual ACM/IEEE International Symposium on Microarchitecture, Dec. 2, 1998, pp. 259-271.

"Non Final Office Action Issued in U.S. Appl. No. 17/833,750", dated Dec. 29, 2022, 9 Pages.

Pewny, et al., "Cross-Architecture Bug Search in Binary Executables", In IEEE Symposium on Security and Privacy, May 17, 2015, pp. 709-724.

Wu, et al., "BIN: A Two-Level Learning-Based Bug Search for Cross-Architecture Binary", In IEEE Access, vol. 7, Dec. 6, 2019, pp. 169548-169564.

U.S. Appl. No. 16/828,089, filed Mar. 24, 2020.
U.S. Appl. No. 17/833,750, filed Jun. 6, 2022.
U.S. Appl. No. 16/945,458, filed Jul. 31, 2020.
U.S. Appl. No. 17/702,714, filed Mar. 23, 2022.
U.S. Appl. No. 16/417,493, filed May 20, 2019.

"Notice of Allowance Issued in U.S. Appl. No. 17/833,750", dated Mar. 9, 2023, 10 Pages.

Bruening, et al., "Thread-Shared Software Code Caches", In Proceedings of International Symposium on Code Generation and Optimization, Mar. 26, 2006, 11 Pages.

Liu, et al., "Programmable Decoder and Shadow Threads: Tolerate Remote Code Injection Exploits with Diversified Redundancy", In Proceedings of Design, Automation & Test in Europe Conference & Exhibition, Mar. 24, 2014, 6 Pages.

Zhou, et al., "Detecting Attacks that Exploit Application-Logic Errors Through Application-Level Auditing", In Proceedings of 20th Annual Computer Security Applications Conference, Dec. 6, 2004, 11 Pages.

* cited by examiner

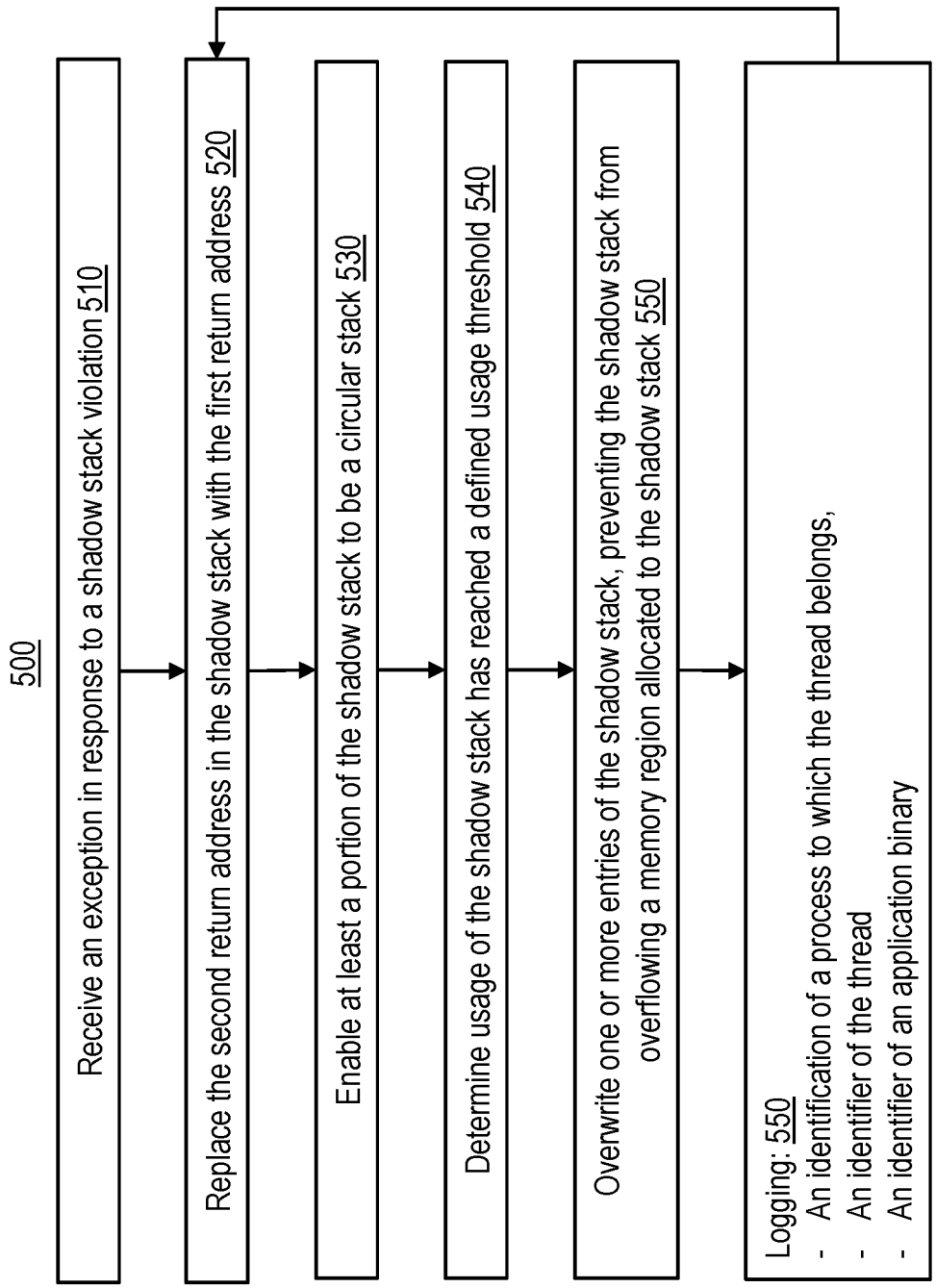

CIRCULAR SHADOW STACK IN AUDIT MODE

CROSS-REFERENCE TO RELATED APPLICATIONS

This application is a continuation-in-part of U.S. application Ser. No. 16/828,089, filed Mar. 24, 2020, and entitled SHADOW STACK VIOLATION ENFORCEMENT AT MODULE GRANULARITY, the entire content of which is incorporated herein by reference. This application is also a continuation-in-part of U.S. application Ser. No. 16/945,458, filed Jul. 31, 2020, and entitled SHADOW STACK ENFORCEMENT RANGE FOR DYNAMIC CODE, the entire content of which is incorporated herein by reference.

BACKGROUND

In most modern computing architectures, an operating system allocates a portion of system memory for each thread to a call stack (sometimes referred to as a machine stack or an execution stack). This call stack is used to facilitate procedure calls (e.g., functions, routines, etc.) within application code. In general, each time a procedure is called during execution of a thread, a new stack frame is added or "pushed" to the call stack for that thread. This stack frame is generally created by a "prologue" to the procedure which can save state information needed to return to the calling context (e.g., a return address of the next instruction to be executed after the procedure exits, saved register values, etc.), allocate memory for any parameters passed to the procedure, allocate memory for local variables to the procedure, etc. The particular data that is included in a stack frame, and the layout of that data, varies depending on processor architecture, operating system, etc. When a procedure exits, its stack frame is removed or "popped" from the call stack for the thread. This stack frame is generally removed by an "epilogue" to the procedure, which can restore saved information needed by the calling context (e.g., by placing a saved return address in a program counter or instruction counter, restore saved register values, etc.) and deallocate any call stack memory that was occupied by the stack frame.

Recently, some operating systems and/or processors have included support for shadow stacks. A shadow stack is a mechanism for protecting a procedure's stored return address from malicious or unintentional modification, such as when a call stack "buffer overflow" causes the procedure to return to an address other than its proper return address when it completes (e.g., within malicious code, rather than the calling context). For example, a malicious actor may be able to accomplish a stack buffer overflow attack by taking advantage of flaws in a procedure's bounds checking to write beyond the amount of memory allocated to parameters and/or local variables in the procedure's stack frame, and into stack memory in the procedure's stack frame that is used to store the procedure's return address. Thus, the malicious actor can use a stack buffer overflow to replace a procedure's stored memory address with a new memory address (e.g., within the malicious actor's own code, or within code that was not otherwise intended to be executed upon return from the procedure). A shadow stack for a thread is a second, separate stack that "shadows" a thread's normal call stack. When shadow stack enforcement is enabled for an application's thread, execution of each of that application's procedure prologues causes a return address to be stored in both the thread's call stack and the thread's shadow stack. Execution of each of that application's procedure epilogues, on the other hand, causes a return address to be loaded from both the thread's call stack and the thread's shadow stack, and then compared. If the two records of the return address differ between the call stack and the shadow stack, then a shadow stack violation is detected, and the thread (or the process to which the thread belongs) is terminated.

BRIEF SUMMARY

When shadow stack enforcement features are enabled within an ecosystem, executing code is required utilize its call stack in an expected manner; otherwise, that code may cause a fatal system error, such as a "blue screen," kernel panic, etc. However, not all code is currently compliant with shadow stack functionality. To ensure an ecosystem and/or drivers are compliant with shadow stack functionality, an audit mode may be enabled to get telemetry on what code breaks when shadow stack enforcement is enabled. In embodiments, when a shadow stack mismatch occurs, the CPU issues an exception (e.g., a control protection exception). In the audit mode, when the exception is issued, instead of enforcing any policies, the mismatched entry in the shadow stack is replaced with the entry in the call stack, and a reporting telemetry may be generated (including, for example, an application binary name, back-trace information, etc.). This telemetry can then be utilized by a developer to improve shadow stack compatibility, to add the application binary to shadow stack block-list, etc. As such, the incompatibilities with shadow stacks can be caught in the audit mode.

However, certain shadow stack incompliant software programs, such as (but not limited to) certain games, behave differently, such that a mismatch of return addresses cannot be simply mitigated by replacing the return address in the shadow stack with the return address in the call stack. For example, when some incompliant software programs are running in the audit mode, they are not aware of shadow stacks. When such a software program continuously performs calls, many addresses are kept on being pushed onto both the call stack and the shadow stack. Because such a phenomenon does not trigger the CPU to issue a traditional control protection exception, the shadow stack may overflow its allocated memory buffer and cause a fatal system error.

At least some embodiments described herein solve the above problem by enabling at least a portion of a shadow stack to be a circular stack in the audit mode, such that when usage of the shadow stack has reached a defined usage threshold, contents in at least a portion of the shadow stack are overwritten. Accordingly, in the audit mode, the computer system is able to get data on certain application binaries that currently are not compliant with the shadow stack, while simultaneously preventing the shadow stack from overflowing and causing a fatal system error.

Some embodiments are directed to methods, systems, and computer program products that enable at least a portion of a shadow stack to be a circular stack in an audit mode. Execution of a thread is initiated at a processor. This includes initiating execution of executable code of an application binary as part of the thread. The application binary is enabled for shadow stack functionality in the audit mode. Based at least on execution of the thread at the processor in the audit mode, at least a portion of a shadow stack is made a circular stack. Making at least a portion of the shadow stack a circular stack includes determining whether usage of the shadow stack has reached a defined usage threshold. In response to determining that usage of the shadow stack has reached the defined usage threshold, one or more entries of return addresses in the shadow stack are overwritten to prevent the shadow stack from overflowing a memory region allocated to the shadow stack.

For example, a software program (that is not aware of the shadow stack) may manually self-manage its call stack (including return addresses) to allow deeper recursion, causing the shadow stack to run out of a memory region allocated to the shadow stack. In some cases, the software program may repeatedly use "call"-like instructions (e.g., function calls) which also use shadow stack, without intervening "ret"-like instructions. Since the "ret" like instructions are configured to pop and validate the entries in the shadow stack, such "call"-like instructions without "ret"-like instructions would cause the shadow stack to keep on growing. When such "call"-like instructions or function calls are excessive, their pushing values onto the shadow stack can cause exhaustion of the shadow stack (also referred to as "shadow stack overflow"). When the shadow stack overflow occurs, a fatal CPU exception may occur. The embodiments described herein prevent the fatal CPU exception, even though it may mean corrupting at least a portion of the shadow stack (by making it circular). As another example, rather than using a "ret" instruction, the software program uses a branch instruction to return to. In such a case, the corresponding return address on the shadow stack would not be popped, and shadow stack overflow may also eventually occur.

In some embodiments, in response to overwriting one or more currently used entries of the shadow stack, one or more telemetries associated with the thread are logged. In some embodiments, the one or more telemetries include (but are not limited to) at least one of (1) an identifier of a process to which the thread belongs, (2) an identifier of the thread, and/or or (3) an identifier of the application binary associated with the thread. In some embodiments, the application binary is a device driver. Examples of application binary identifiers include (but are not limited to) a file name, a hash of a particular portion of the binary, an embedded version metadata of the application binary, and/or a combination thereof.

In some embodiments, the shadow stack functionality can also be enabled in an enforcement mode. When the enforcement mode is enabled, the computer system refrains from enabling any portion of the shadow stack to be a circular stack. In some embodiments, enabling the shadow stack to be a circular stack further includes determining that the audit mode is enabled prior to making the shadow stack a circular stack.

In some embodiments, the shadow stack comprises a maximum number of spaces for entries of return addresses based on a size of memory region allocated to the shadow stack, and one or more entries of return addresses are entered in one or more sequential spaces among the maximum number of spaces until usage of the shadow stack has reached the defined usage threshold.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not, therefore, to be considered to be limiting of its scope, the invention will be described and explained with additional specificity and detail through the use of the accompanying drawings in which:

FIG. 5 illustrates a flowchart of an example method for processing a shadow stack violation in the audit mode.

DETAILED DESCRIPTION

Figure 1A:
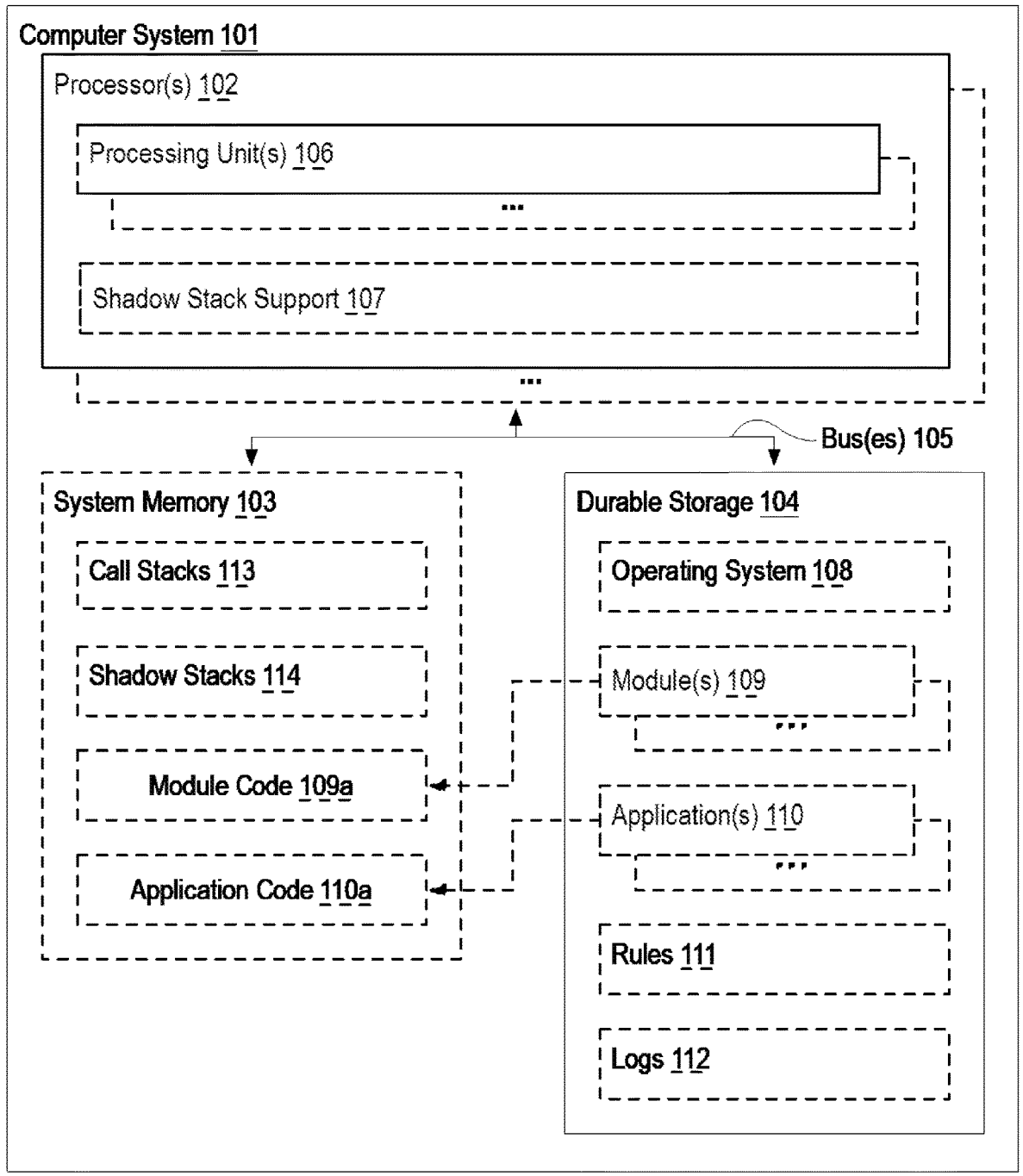
FIG. 1A illustrates an example computer system that facilitates enforcing shadow stack violations at module granularity.

FIG. 1A illustrates an example computer system 101 that facilitates enforcing shadow stack violations at module granularity. Computer system 101 comprises or utilizes a special-purpose or general-purpose computer hardware, such as, for example, one or more processors 102, system memory 103, and durable storage 104, which are communicatively coupled using one or more communications buses 105.

Embodiments within the scope of the present invention include physical and other computer-readable media for carrying or storing computer-executable instructions and/or data structures. Such computer-readable media can be any available media that are accessible by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid-state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links that can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network, or data link can be buffered in RAM within a network interface module, and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computer system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

As shown in FIG. 1A, each processor 102 includes (among other things) one or more processing units 106 (e.g., processor cores), each of which loads and executes machine code instructions from system memory 103 (usually via one or more processor caches, not shown). In some embodiments, processor(s) 102 include hardware and/or microcode that provide shadow stack support 107 by the processor 102. The particular functionality of processor-based shadow stack support 107 can vary depending on design choices, but example functionality includes the ability to allocate and protect memory regions for shadow stack use (e.g., via page table mappings), the ability to "push" return addresses onto a shadow stack during execution of a procedure prologue (e.g., as part of execution of a "call" instruction), the ability to "pop" a return address from a shadow stack during execution of a procedure epilogue (e.g., as part of execution of a "return" instruction), the ability to compare one return address popped from a call stack with another return address popped from a shadow stack (e.g., as part of execution of a "return" instruction), and/or the ability to trigger an exception when there is a mismatch between the return address popped from a call stack and the return address popped from a shadow stack. However, it will be appreciated that the embodiments herein could be implemented without processor-based shadow stack support 107. For example, functionality of shadow stack support 107 could instead be provided by an operating system and/or could be complied into procedure prologues and epilogues of an application binary.

As illustrated, the durable storage 104 stores computer-executable instructions and/or data structures representing executable software components; correspondingly, during execution of this software at the processor(s) 102, one or more portions of these computer-executable instructions and/or data structures are loaded into system memory 103. For example, the durable storage 104 is shown as storing computer-executable instructions and/or data structures corresponding to an operating system 108, one or more module(s) 109, and one or more application(s) 110. The durable storage 104 also stores data, such as rules 111 and logs 112.

The system memory 103 is capable of storing a broad variety of data, but for purposes of illustrating the embodiments herein, the system memory 103 is shown as storing at least a portion of code of at least one running application (i.e., application code 110*a*) and at least a portion of code of a module called by that running application (i.e., module code 109*a*), as well as memory allocated to call stacks 113 and shadow stacks 114 (including, for example, a call stack and a shadow stack for the running application).

Figure 1B:
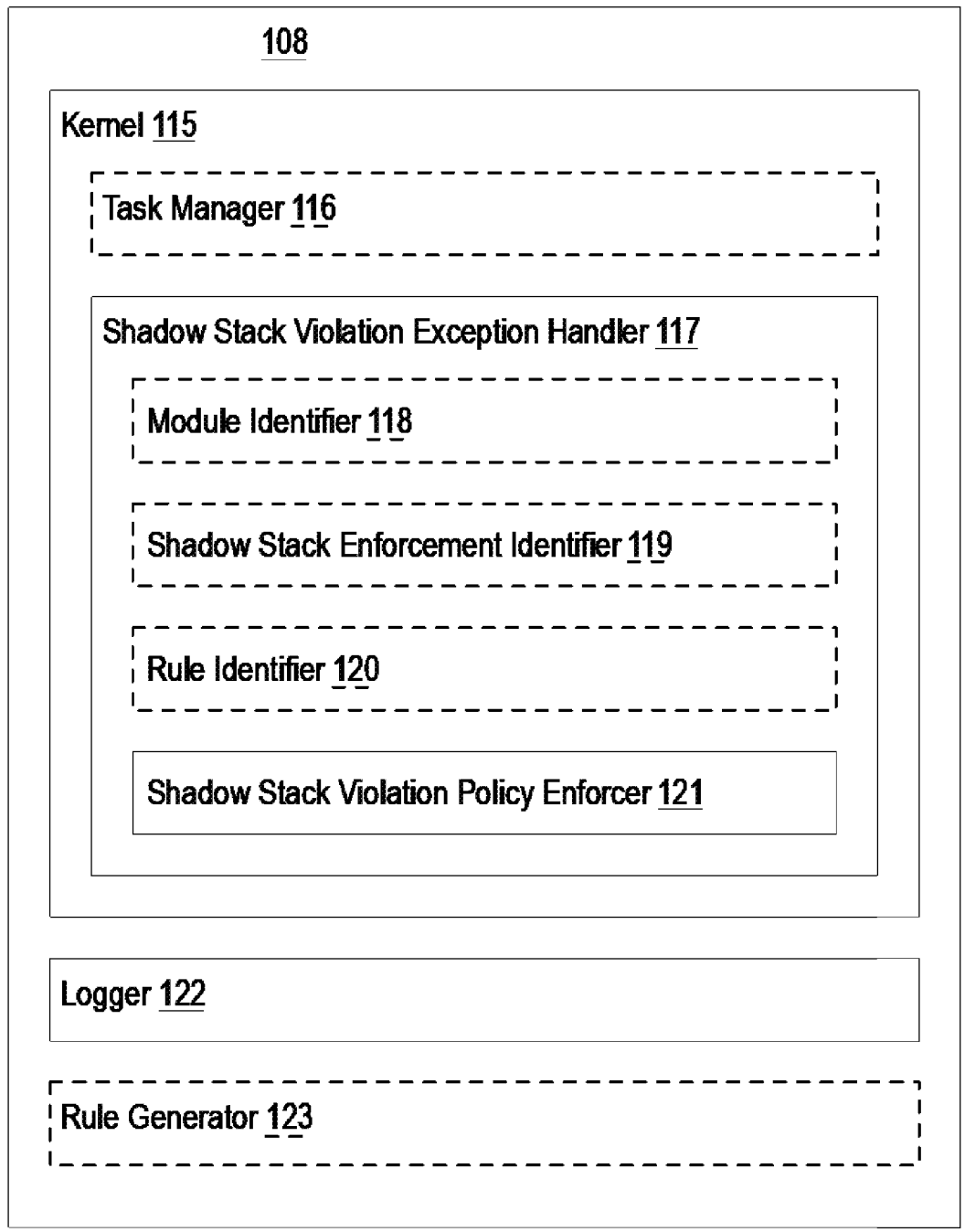
FIG. 1B illustrates example operating system components that facilitate enforcing shadow stack violations at module granularity.

FIG. 1B illustrates details of operating system 108, including example components that facilitate enforcing shadow stack violations at module granularity, according to some embodiments. It will be appreciated that the depicted components—including their identity, sub-components, and arrangement—are presented merely as an aid in describing various embodiments of operating system 108 described herein, and that these components are non-limiting to how software and/or hardware might implement various embodiments described herein, or of the particular functionality thereof.

Operating system 108 is illustrated as including kernel 115 that includes a task manager 116 which is responsible for launching and managing execution of processes (including one or more threads) at processor(s) 102 based on code of operating system 108 and application(s) 110. The kernel 115 is also shown as including a shadow stack violation exception handler 117 (referred to hereinafter as exception handler 117) that processes exceptions when a shadow stack violation is detected during execution of a thread. In some embodiments, execution of the exception handler 117 is triggered by the shadow stack support 107 of processor(s) 102 (e.g., via a hardware interrupt) when a mismatch between a call stack return address and a shadow stack return address is detected. However, the exception handler 117 could be triggered in other ways (e.g., via a software interrupt or exception), such as by code that executes as part of a procedure epilogue and that determines whether or not a call stack return address and a shadow stack return address match. Thus, the exception handler 117 is capable of being utilized in a wide variety of environments, including those that include hardware support for shadow stacks (e.g., shadow stack support 107), and those that lack hardware shadow stack support (e.g., in which shadow stack functionality is implemented entirely in software, such as via specially-configured procedure prologues and epilogues).

It is noted that the description of exception handler 117 herein is focused on handling of exceptions when a module called by a primary application binary causes a shadow stack violation. It will be appreciated that the exception handler 117 could be invoked in other situations as well, such as when the primary application binary, itself, causes a shadow stack violation. Thus, in addition to the description herein of the handling of exceptions when a module called by a primary application binary causes a shadow stack violation, the exception handler 117 could also be configured to handle other situations, such as such as when the primary application binary, itself, causes a shadow stack violation. It will be appreciated, therefore, that the description of the exception handler 117 herein is not limited to those scenarios and functions specifically described herein.

The operating system 108 is also shown as including a logger 122, and as potentially including a rule generator 123. In general, the logger 122 generates log entries (e.g., which are stored in logs 112) in connection with operation of the exception handler 117. In general, the rule generator 123, if present, processes logs 112 and/or sends logs 112 to a remote system for processing. As a result of rule generator 123, computer system 101 generates and/or receives rules 111 that are usable by the exception handler 117. Note that while the rule generator 123 is depicted, for ease in illustration, as being part of operating system 108, in some embodiments the rule generator 123 is part of a separate application 110 (e.g., a system security application, such as an antivirus application).

Further operation of the components of FIGS. 1A, 1B are now described in connection with FIGS. 2A-2D (which illustrate an example operation of enforcement of shadow stack violations at module granularity), and in connection with FIG. 3 (which illustrates a flow chart of an example method 300 for enforcing a shadow stack violation at module granularity) and FIG. 4 (which illustrates a flowchart of an example method 400 for making a shadow stack a circular stack in an audit mode). The following discussion refers to a number of methods and method acts. Although the method acts may be discussed in a certain order, or may be illustrated in a flow chart as occurring in a particular order, no particular ordering is required unless specifically stated, or required because an act is specifically described as being dependent on another act being completed prior to the act being performed.

Figure 3:
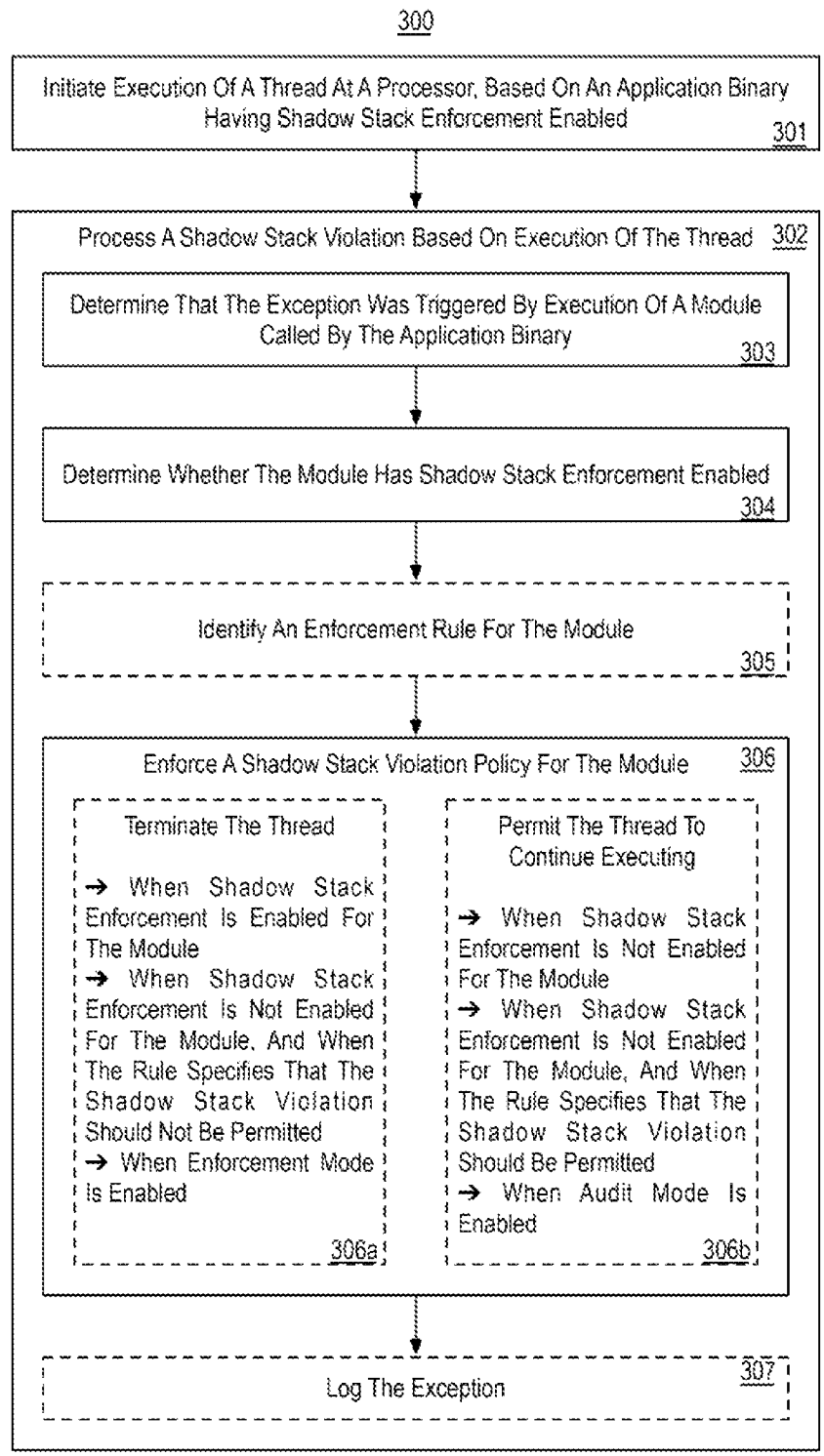
FIG. 3 illustrates a flow chart of an example method for enforcing a shadow stack violation at module granularity.

Referring initially to FIG. 3, as shown, method 300 comprises an act 301 of initiating execution of a thread at a processor, based on an application binary having shadow stack enforcement enabled. In some embodiments, act 301 comprises initiating execution of a thread at the processor, including initiating execution of first executable code of an application binary that calls second executable code of an external module, the application binary having been enabled for shadow stack enforcement. For example, in an embodiment the task manager 116 initiates execution of one of applications 110 at processors(s) 102. Initiating execution includes the task manager 116 causing application code 110*a* for the application 110 to be loaded into system memory 103, creating kernel data structures supporting execution of one or more threads at processing unit(s) 106, and creating (or initiating creation of) a call stack (i.e., within call stacks 113) for each of these one or more threads. In addition, since shadow stack enforcement is enabled for the application's binary, initiating execution also includes the task manager 116 creating (or initiating creation of) a shadow stack 114 (i.e., within shadow stacks 114) for each of these one or more threads.

Figure 2A:
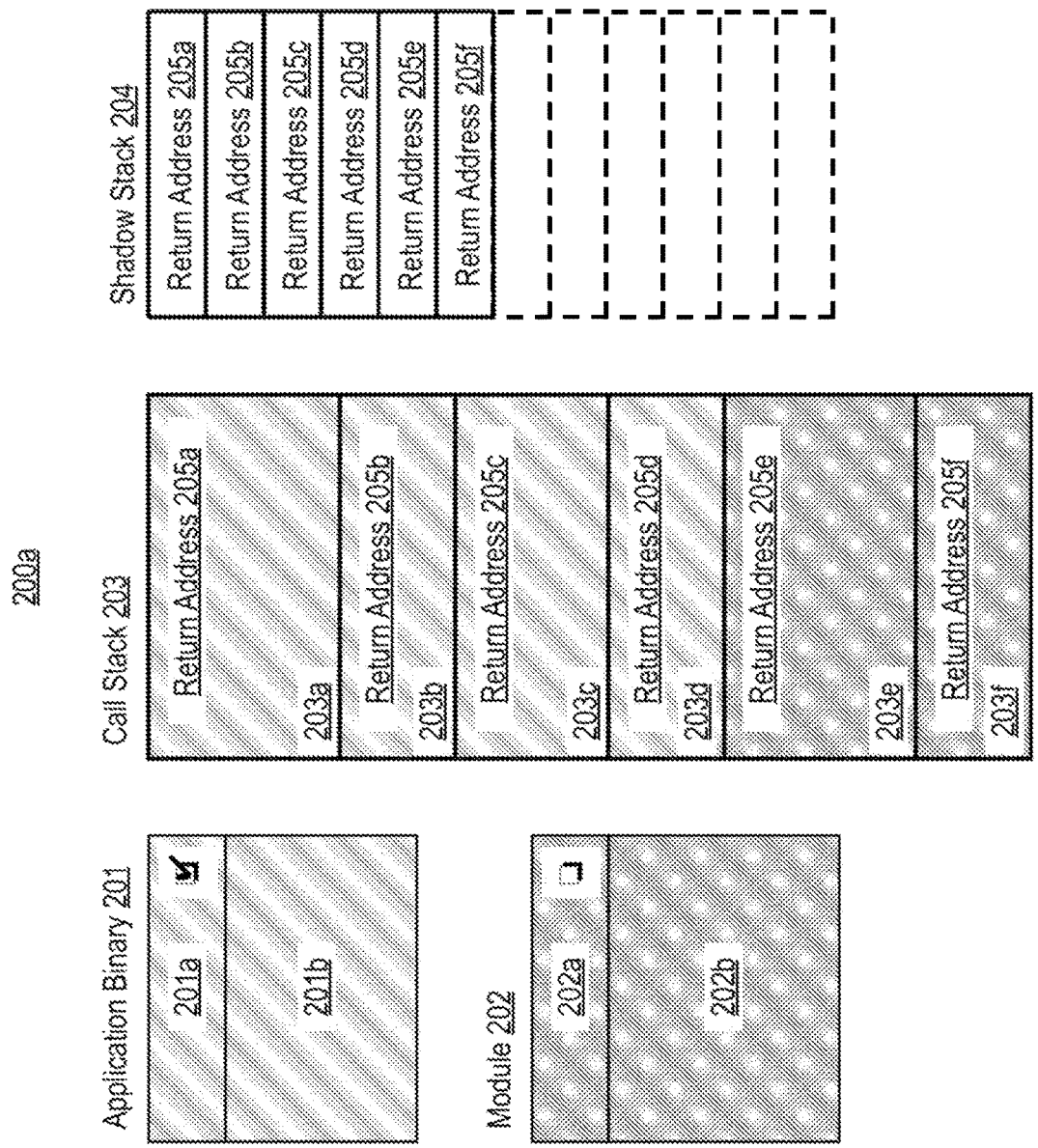
FIGS. 2A-2C illustrate an example operation of enforcement of shadow stack violations at module granularity.

In a more particular example, FIG. 2A illustrates an example 200*a* that depicts a representation of an application binary 201. While binary formats vary from operating system to operating system, in general, a binary includes a header describing properties and layout of the binary, and a body that comprises application code and data (e.g., in the form a text segment, a data segment, etc.). Thus, in FIG. 2A, application binary 201 is shown as including a header 201*a* portion and a body 201*b* portion. In embodiments, as part of initiating execution of an application's binary (e.g., application binary 201), the task manager 116 reads the binary's header (e.g., header 201*a*) to obtain binary properties and layout, and loads at least a portion of the binary's body (e.g., body 201*b*) into system memory 103 (e.g., at least a portion of which could correspond to application code 110*a*). In FIG. 2A, header 201*a* is shown as including a checkbox containing a checkmark. In FIG. 2A, this checkbox represents a flag or other indicator of whether or not the application binary 201 was compiled with support for, and requests enforcement of, shadow stacks. Note that it is possible that a binary could be compiled to support shadow stacks (i.e., the binary is shadow stacks aware/compliant), but not actually request their enforcement (i.e., the binary has not opted-in to shadow stack enforcement). Thus, while header 201a is shown as including a binary indicator (i.e., checked or not), it is possible for header 201a to have a more comprehensive set of flags/indicators. In example 200a, since header 201a includes checkmark, shadow stack enforcement is enabled for application binary 201 and/or the binary has opted-in to shadow stack enforcement. Thus, when the task manager 116 initiates execution of application binary 201, task manager 116 creates shadow stack(s) for any thread(s) created for that binary. FIG. 2A shows that the task manager 116 has initiated execution of at least one thread for application binary 201, since it creates a call stack 203 and a shadow stack 204 corresponding to that initiated thread. It is noted that, in FIG. 2B, call stack 203 and shadow stack 204 "grow" downward; that is, new information is pushed onto the bottom of these stacks, such that the "top" item on the stack is visually shown at the bottom of the call stack 203 and the shadow stack 204.

In embodiments, when an application binary is loaded, the task manager 116 identifies any module(s) that will be accessed by that binary during its execution (e.g., based on information in header 201a). FIG. 2A depicts a module 202 that is called by application binary 201. Similar to application binary 201, module 202 is shown as including a header 202a portion and a body 202b portion. At least a portion of the code of body 202b can be loaded to system memory (e.g., module code 109a) in connection with initiating execution of application binary 201, or at some later time. In FIG. 2A, header 202a is shown as having an empty checkbox. Thus, since header 201a lacks checkmark in the checkbox, shadow stack enforcement is not supported by module 202 and/or the module has not opted-in to shadow stack enforcement. However, since shadow stack enforcement is enabled for application binary 201, and since the code of module 202 executes within the context of call stack 203, computer system 101 also maintains shadow stack 204 during execution of the code of module 202.

Notably, in connection with initiating execution of a thread for application binary 201, the task manager 116 can store a record (e.g., as part of kernel thread data structures) of whether or not shadow stack enforcement is enabled and/or requested for each of application binary 201 and module 202. Thus, in some embodiments, act 301 comprises storing a record of whether or not the external module is enabled for shadow stack enforcement in connection with initiating execution of the thread.

FIG. 2A shows a state of call stack 203 and shadow stack 204 after the initiated thread has executed for at least some period of time. For example, call stack 203 is shown as including four stack frames 203a-203d that were created in connection with execution of code of application binary 201 (e.g., due to internal procedure calls within that binary), as well as two stack frames 203e-203f that were subsequently created in connection with execution of code of module 202 (e.g., due to application binary 201 calling a procedure within module 202, and due to module 202 calling an internal procedure). Each of these stack frames 203a-203f is illustrated as storing a corresponding return address (i.e., return address 205a for stack frame 203a, return address 205b for stack frame 203b, return address 205c for stack frame 203c, return address 205d for stack frame 203d, return address 205e for stack frame 203e, and return address 205f for stack frame 203f). Correspondingly, shadow stack 204 is shown as also storing these same return addresses 205, in the same order. Since the "stack" or return addresses on call stack 203 match the "stack" of return addresses on shadow stack 204, as of FIG. 2A there are would be no shadow stack violations if stack frames 203a-203f were to be popped from the call stack 203.

Figure 2B:
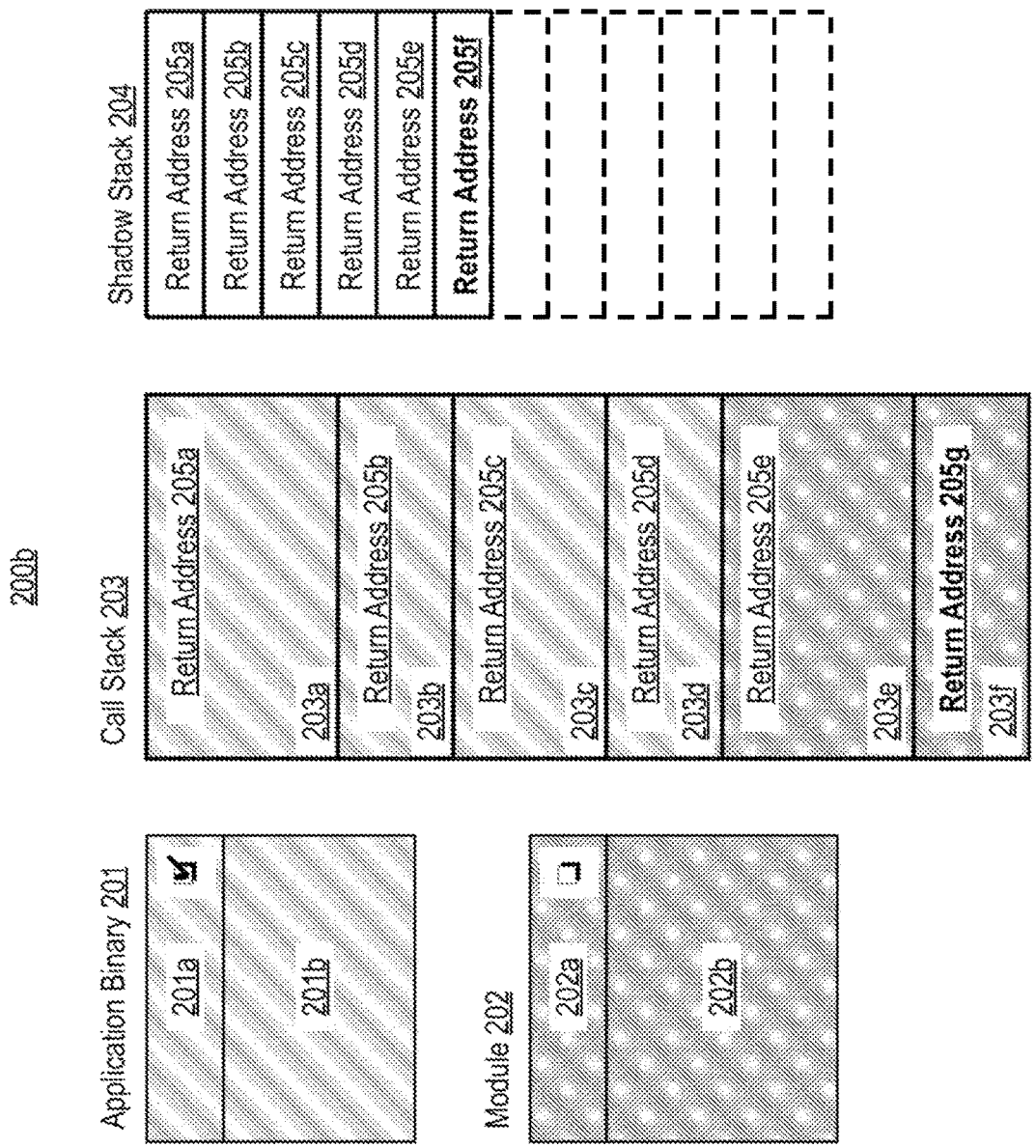
Figure 2C:
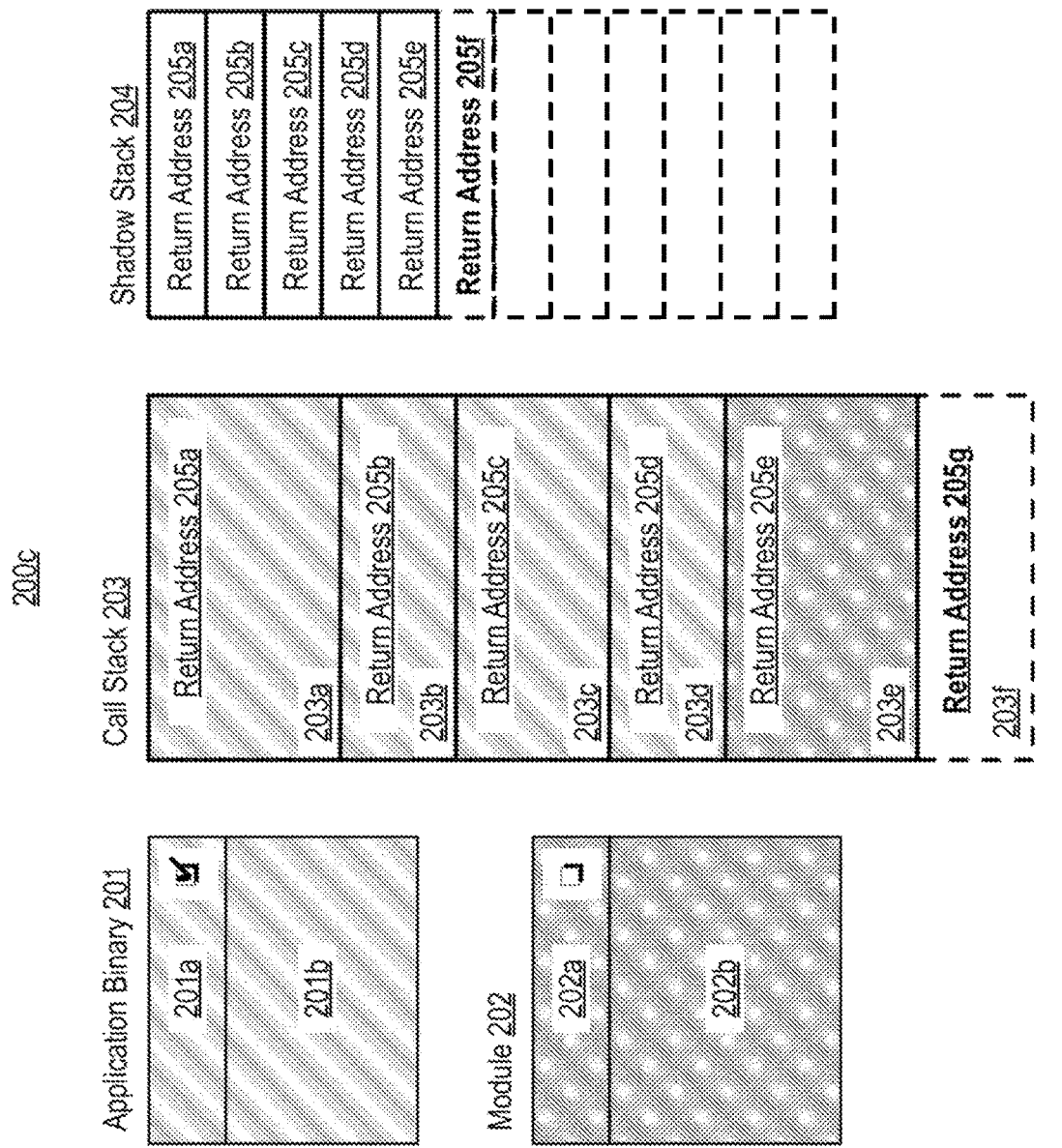

Turning to FIG. 2B, the current "top" stack frame 203f on call stack 203 now contains a new return address (i.e., return address 205g), which differs from the "top" return address on shadow stack 204 (i.e., return address 205f). This new return address 205g could have been written to stack frame 203f due to a bug within module 202, due to intentional ROP behavior by module 202, or even due to a malicious attack targeting module 202. Turning to FIG. 2C, stack frame 203f is now being "popped" from call stack 203 (e.g., due to execution of a procedure epilogue within module 202). As a result, the return address 205f is also popped from shadow stack 204. By operation of shadow stack logic (e.g., as part of a procedure epilogue and/or by shadow stack support 107 within processor(s) 102), a mismatch is detected between return address 205g and return address 205f. As a result, a shadow stack violation is detected (e.g., by procedure epilogue code and/or by shadow stack support 107), triggering a hardware or software exception.

Returning to FIG. 3, method 300 also comprises an act of 302 of processing a shadow stack violation based on execution of the thread. In some embodiments, act 301 comprises, based at least on execution of the thread at the processor, processing an exception triggered by a mismatch between a first return address popped from a call stack corresponding to the thread and a second return address popped from a shadow stack corresponding to the thread. In an example, as a result of an exception triggered by the return address mismatch described in connection with FIGS. 2B and 2C, the exception handler 117 is invoked to handle the exception. The exception handler 117 is shown as including a variety of components that are usable for handling the exception. These components are described in connection with acts 303-306, which are shown in FIG. 3 as sub-acts of act 302.

Act 302 comprises an act of 303 of determining that the exception was triggered by execution of a module called by the application binary. In some embodiments, act 303 comprises determining that the exception resulted from execution of an instruction in the second executable code of the external module. For example, the exception handler 117 is shown as including a module identifier 118. In embodiments, the module identifier 118 operates to determine an identity of a module that triggered the exception, if any.

In some embodiments, the module identifier 118 operates by identifying a memory address corresponding to a "calling site" of an instruction that triggered the exception. For instance, if the instruction that triggered the instruction was a "return" instruction in a procedure epilogue, the memory address corresponding to the "calling site" of this instruction is the memory address at which the "return" instruction is stored in system memory. If this "return" instruction is part of a procedure epilogue of the executing application binary (e.g., application binary 201), then the instruction's memory address would be within a range of memory addresses occupied by application code 110a in system memory 103; in this case, the module identifier 118 would determine that the calling site address is part of the application binary. On the other hand, if this "return" instruction is part of a procedure epilogue of the module called by the application binary (e.g., module 202), then the instruction's memory address would be within a range of memory addresses occupied by module code 109a in system memory 103; in this case, the module identifier 118 would determine that the calling site address is part of the module.

In additional, or alternative, embodiments, the module identifier 118 operates by identifying a memory address corresponding to a memory address that was the "target address" of the instruction that triggered the exception. For instance, if the instruction that triggered the instruction was a "return" instruction in a procedure epilogue, the memory address corresponding to the "target address" of this instruction is the saved return address in the call stack frame for this procedure. If this saved return instruction is part of the executing application binary (e.g., application binary 201), then the instruction's memory address would be within a range of memory addresses occupied by application code 110a in system memory 103; in this case, the module identifier 118 would determine that the target site address is part of the application binary. On the other hand, if this saved return instruction is part of the module called by the application binary (e.g., module 202), then the instruction's memory address would be within a range of memory addresses occupied by module code 109a in system memory 103; in this case, the module identifier 118 would determine that the target site address is part of the module.

As will appreciated, depending on the nature of the stack frame being removed, the module identifier 118 could identify the same entity for both of the calling site and the target address, or the module identifier 118 could identify different entities for each of the calling site and the target address. For example, a "return" instruction within module 202 could have as its target address a return address within module 202, in which case both of the calling site and the target address would correspond to the same entity. In another example, a "return" instruction within module 202 could have as its target a return address within application binary 201, or some other entity, in which case the calling site and the target address would correspond to different entities.

In view of the foregoing discussion of the module identifier 118 it will be appreciated that, in some embodiments of act 302, determining that the exception resulted from execution of the instruction in the second executable code of the external module comprises determining one or more of, (i) that a calling site address of the instruction corresponds to the second executable code of the external module, or (ii) that a target address of the instruction corresponds to the second executable code of the external module.

Referring again to the example of FIG. 2C, during processing of an exception triggered by removal of stack frame 203f, in embodiments of act 303 the module identifier 118 identifies module 202 as corresponding to a calling site address (i.e., since it would be a procedure epilogue of module 202 that removes the procedure epilogue). Depending on which code return address 205g corresponds to (if any), in some embodiments the module identifier 118 identifies a target site address as corresponding to module 202, to application binary 201, to some other entity, or to no entity at all.

As noted above, the exception handler 117 could be invoked in situations in which the exception was not triggered by a module, such as when the primary application binary, itself, causes a shadow stack violation. In these situations, the exception handler 117 might proceed to enforcing the shadow stack violation by terminating the thread, or by permitting the thread to continue executing if an audit mode is enabled. Audit mode is described later in connection with act 306.

Assuming a module is identified in act 303, act 302 also comprises an act of 304 of determining whether the module has shadow stack enforcement enabled. In some embodiments, act 304 comprises determining whether or not the external module is enabled for shadow stack enforcement. For example, the exception handler 117 is shown as including a shadow stack enforcement identifier 119 (referred to hereinafter as enforcement identifier 119). In embodiments, the enforcement identifier 119 determines whether or not the module identified in act 303 has shadow stack enforcement enabled. For example, referring to module 202, the enforcement identifier 119 would determine that module 202 does not have shadow stack enforcement enabled (i.e., because there is no check mark in the header 202a of module 202).

As discussed in connection with FIG. 2A, it is possible that a binary was compiled with support for shadow stacks (i.e., the binary is shadow stacks aware/compliant), but without a request for shadow stack enforcement (i.e., the binary has not opted-in to shadow stack enforcement). Thus, in some embodiments of act 304, the enforcement identifier 119 determines one or more of (i) whether or not the module was compiled with support for shadow stacks, or (ii) whether or not the module opted-in to shadow stack enforcement. In some embodiments, an external module is enabled for shadow stack enforcement when (i) the external module is compiled for shadow stack compliance (i.e., if there is no option to opt-in or opt-out), or (ii) when the external module is compiled to opt-in to shadow stack enforcement (i.e., if there is an option to opt-in or opt-out). Similarly, in some embodiments, an external module is not enabled for shadow stack enforcement when the external module is not compiled for shadow stack compliance (i.e., if there is no option to opt-in or opt-out), or (ii) when the external module is compiled to opt-out of shadow stack enforcement (i.e., if there is an option to opt-in or opt-out).

In some embodiments, the enforcement identifier 119 consults the header of the module identified in act 303 to determine whether or not the module is enabled for shadow stack enforcement. However, as discussed, in some embodiments act 301 comprises storing a record of whether or not the external module is enabled for shadow stack enforcement in connection with initiating execution of the thread. In these embodiments, determining whether or not the external module is enabled shadow stack enforcement can comprise the enforcement identifier 119 consulting this record, rather than needing to actually look at the module header itself.

In some embodiments, act 302 also comprises an act of 305 of identifying an enforcement rule for the module. In some embodiments, act 305 comprises identifying a rule based at least on an identity of the external module. For example, the exception handler 117 is shown as including a rule identifier 120. In embodiments, the rule identifier 120 consults rules 111 to determine if there exists a rule that specifies whether the exception should be permitted for the external module (i.e., in which case the thread should be permitted to continue executing), or whether the exception for should be disallowed for the external module (i.e., in which case the thread should be terminated). In embodiments, rules 111 are created based on analysis of prior logging (i.e., by logger 122) of shadow stack violations involving the external module at computer system 101 and/or at another computer system. In embodiments, the rule identifier 120 identifies a rule further based an identity of the application binary (i.e., in addition to an identity of the external module). Thus, in some embodiments the rules 111 are specific to a particular combination of application binary and external module.

Act 302 also comprises an act of 306 of enforcing a shadow stack violation policy for the module. In some embodiments, act 306 comprises, based on having determined whether the external module is enabled for shadow stack enforcement, performing one of terminating the thread (i.e., act 306a) or permitting the thread to continue executing (i.e., act 306b). For example, the exception handler 117 is shown as including a shadow stack policy enforcer 121 (referred to hereinafter as policy enforcer 121). In embodiments, the policy enforcer 121 either terminates the thread or permits the thread to continue executing depending on whether or not shadow stack enforcement is enabled for the external module, whether or not a rule identified in act 305 specifies that shadow stack violations should be permitted, and/or whether or not an enforcement mode or an audit mode is enabled. In some embodiments, when the audit mode is enabled, the second return address 205f in the shadow stack 204 is replaced with the first return address 205g in the call stack 203, such that the shadow stack violation policy is not enforced in the audit mode. Even though the shadow stack violation policy is not enforced in the audit mode, the audit mode is still useful for logging the shadow stack violation, which will be further described below.

As shown, act 306 can invoke act 306a to terminate the thread based at least on (i) shadow stack enforcement being enabled for the module, or (ii) shadow stack enforcement not being enabled for the module but a rule (i.e., accessed in act 305) specifies that the shadow stack violation should not be permitted. For example, if shadow stack enforcement is enabled for the module, then the module has requested that shadow stack violations by the module be enforced, so the policy enforcer 121 terminates the thread. If, on the other hand, shadow stack enforcement is not enabled for the module, then the policy enforcer 121 can default to permitting the thread to continue executing but override that default if a rule so specifies; thus, the module may not be compiled for shadow stack compliance (or may opt-out of shadow stack enforcement), but the policy enforcer 121 may nonetheless enforce shadow stack violations by the module.

On the other hand, and as shown, act 306 can invoke act 306b to permit the thread to continue executing based at least on (i) shadow stack enforcement not being enabled for the module (and there are no rules for the module), or (ii) shadow stack enforcement not being enabled for the module and a rule specifies that the shadow stack violation should be permitted. For example, if shadow stack enforcement is not enabled for the module, then the policy enforcer 121 can default to permitting the thread to continue executing. In addition, a rule (i.e., rules 111) could further specify that shadow stack violations should be permitted for the module. Thus, in some embodiments of act 306a, the computer system permits the thread to continue executing when the external module is not enabled for shadow stack enforcement and when the rule specifies that a shadow stack violation should be permitted.

Act 306a also shows that the thread could be terminated based at least on enforcement mode being enabled, while act 306b also shows that the thread could be permitted to continue executing based at least on audit mode being enabled. In embodiments, the policy enforcer 121 operates in either an enforcement mode or an audit mode—either globally, or on a per-thread, per-application binary, and/or per-module basis. When operating in enforcement mode, the policy enforcer 121 terminates a thread, or permits it to execute, based on the policies already described in connection with acts 306a and 306b. When operating in audit mode, on the other hand, the policy enforcer 121 permits a thread to continue executing even in cases where it would normally be terminated under the polices described in connection with act 306a. When combined with logging by the logger 122, audit mode is useful for logging shadow stack violations by executing code (whether that be code within a primary application binary and/or within an external module called by that application binary) without actually terminating a thread when a violation occurs.

Method 300 also comprises an act of 307 of logging the exception. For example, the logger 122 can log one or more data items about the exception into logs 112. In embodiments, act 307 is performed both when the policy enforcer 121 operates in enforcement mode and when it operates in audit mode, though it could be configured to refrain from logging in some situations. As examples, in various embodiments the logger 122 logs one or more of a calling site address, a target address, an identifier of the external module, an identifier of a process to which the thread belongs, an identifier of the thread, an identifier of an application binary, whether enforcement mode or audit mode is enabled, whether a shadow stack violation was enforced or permitted, etc. In embodiments, when logging an identifier of an external module or an application binary, logger 122 logs a filesystem path to the external module or the application binary. In some embodiments, the logger 122 preserves user privacy in these situations by removing or obfuscating personally identifiable information, such as a path portion corresponding to a user's home or profile directory.

As mentioned, the rule generator 123 (if present) processes logs 112, and/or sends logs 112 to a remote system for processing, in order to generate and/or receive rules 111 that are usable by the exception handler 117. As also mentioned, the rule identifier 120 (if present) consults these rules 111 to determine if an exception should be permitted for an external module based on an identity of the external module, potentially in combination with an identity of the application binary. The rule generator 123 (together with any remote system(s) involved) can use a vast variety of techniques to process logs 112 in order to generate rules 111, including the use of any appropriate machine learning techniques. In embodiments, the rule generator 123 can generate rules based on identifying modules that frequently (or infrequently) cause shadow stack violations, identifying application/module combinations frequently (or infrequently) shadow stack violations, identifying situations in which an allowed shadow stack violation later caused a thread to crash, identifying situations in suspicious behavior was observed after an allowed shadow stack violation, etc.

Accordingly, the embodiments herein enforce shadow stack violations at module granularity, rather than at the granularity of an entire thread (or process). Thus, rather than simply terminating a thread/process when a shadow stack violation is detected on the thread's stack, the embodiments herein perform checks to determine if the shadow stack violation occurred during execution of an external module, and if so, whether or not shadow stack enforcement is enabled for that module. If the shadow stack violation occurred during execution of a module, and if shadow stack enforcement is enabled for that module, embodiments proceed to terminate the thread (or the process to which it belongs). However, if shadow stack enforcement is not enabled for that module, some embodiments choose to permit the thread to continue executing, rather than terminating it as would be typical. Enforcement of shadow stack violations at module granularity, rather than at thread/process granularity, can increase overall security in a computer system, as well as increase the adoption of shadow stack technologies. For example, rather than needing to disable shadow stack enforcement on this application due to its interaction with modules that trigger shadow stack violations, the embodiments herein enforce shadow stack violations for the application's code, while permitting shadow stack violations by called module code. In this way, shadow stack enforcement can be enabled for an application even if it calls external modules that intentionally tamper with return addresses or that are not yet shadow stack compatible. Thus, the embodiments herein enable the use of shadow stack enforcement for an application—even in situations where it was previously impractical due to the module(s) upon which the application relies, or due to the environment in which the application executes.

Notably, when shadow stack enforcement features are enabled within an ecosystem, executing code is required to utilize its call stack in an expected manner; otherwise, that code may cause a fatal system error, such as a "blue screen," kernel panic, etc. However, not all code is currently compliant with shadow stack functionality. To ensure an ecosystem and/or drivers are compliant with shadow stack functionality, an audit mode may be enabled to get telemetry on what code breaks when shadow stack enforcement is enabled. In embodiments, when a shadow stack mismatch occurs, the CPU issues an exception (e.g., a control protection exception). In the audit mode, when the exception is issued, instead of enforcing any policies, the mismatched entry in the shadow stack is replaced with the entry in the call stack, and a reporting telemetry may be generated (including, for example, one or more of an application binary identifier, back-trace information from the call stack, back-trace information from the shadow stack, etc.). Examples of application binary identifiers include (but are not limited to) a file name, a hash of a particular portion of the binary, an embedded version metadata of the application binary, and/or a combination thereof. This telemetry can then be utilized by a developer to improve shadow stack compatibility, to add the application binary identifier to a shadow stack block-list, etc. As such, the incompatibilities with shadow stacks can be caught in the audit mode.

However, certain shadow stack incompliant software programs, such as (but not limited to) certain games, behave differently, such that a mismatch of return addresses cannot be simply mitigated by replacing the return address in the shadow stack with the return address in the call stack. For example, when some incompliant software programs continuously performs calls without corresponding returns, many addresses are pushed onto both the call stack and the shadow stack. As another example, some incompliant software programs manually adjust their own call stack, such as to allow more repeated function calls. Because such a phenomenon does not trigger the CPU to issue a traditional control protection exception, the shadow stack may overflow its allocated memory buffer and cause a fatal system error.

As another example, a software program (that is not aware of the shadow stack) may self-manage its call stack (including return addresses) to avoid deep recursion, causing the call stack to run out of a memory region allocated to the call stack. In some cases, the software program may repeatedly use "call"-like instructions (e.g., function calls) which also use shadow stack without intervening "ret"-like instructions. Since the "ret" like instructions are configured to pop and validate the entries in the shadow stack, such "call"-like instructions without "ret"-like instructions would cause the shadow stack to keep on growing. When such "call"-like instructions or function calls are excessive, their returns can cause exhaustion of the shadow stack (also referred to as "shadow stack overflow"). When the shadow stack overflow occurs, a fatal CPU exception may occur. The embodiments described herein prevent the fatal CPU exception, even though it may mean corrupting the shadow stack (by making a portion of it circular). As another example, rather than using a "ret" instruction, the software program uses a branch instruction to return from a function call. In such a case, the corresponding return address doesn't pop from the shadow stack, and shadow stack overflow may also occur.

To solve the problem caused by shadow stack overflow, and to safely enable the shadow stack functionality in an audit mode, at least some embodiments described herein are directed to methods, systems, and computer program products that enable at least a portion of a shadow stack to be a circular stack in an audit mode, such that when the usage of the shadow stack has reached a defined usage threshold, contents in at least a portion of the shadow stack are overwritten. As such, in the audit mode, a computer system is able to get data on certain application binaries (such as, but not limited to, certain drivers) that currently do not work with the shadow stack, while preventing the shadow stack from overflowing a memory region allocated to the shadow stack.

Figure 4:
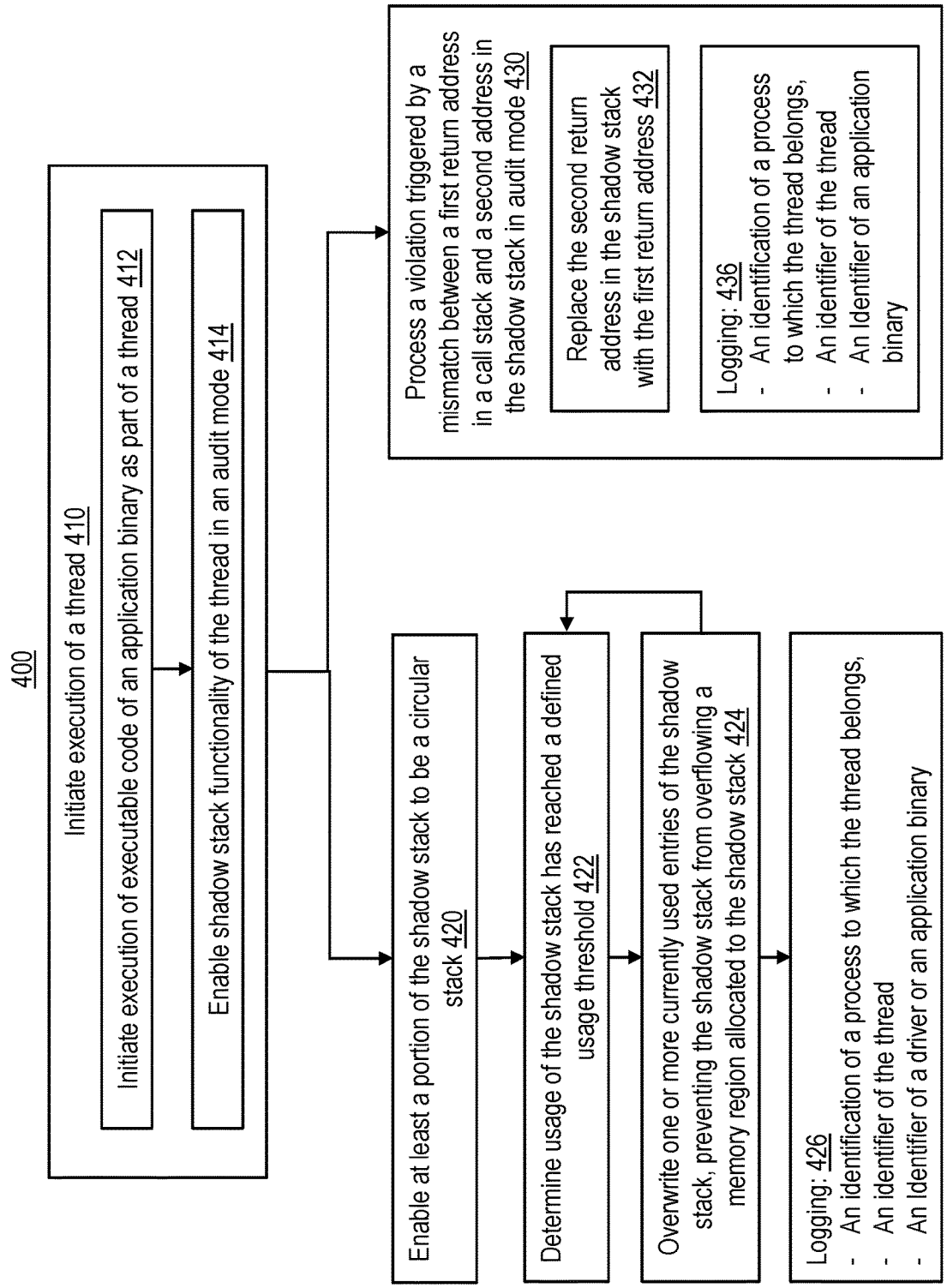
FIG. 4 illustrates a flowchart of an example method for enabling at least a portion of a shadow stack to be a circular stack in an audit mode.

FIG. 4 illustrates a flowchart of an example method 400 for making a shadow stack a circular stack in an audit mode. The method 400 includes initiating execution of a thread at a processor (act 410). In some embodiments, the act 410 includes initiating execution of executable code of an application binary as part of a thread (act 412) and enabling shadow stack functionality of the thread in an audit mode (act 414). For example, in an embodiment, the task manager 116 of FIG. 1B initiates execution of one of applications 110 at processors(s) 102. Initiating execution includes the task manager 116 causes application code 110*a* for the application 110 to be loaded into system memory 103, creating kernel data structures supporting execution of one or more threads at processing unit(s) 106, and creating (or initiating creation of) a call stack (i.e., within call stacks 113) for each of these one or more threads. In some embodiments, an audit mode is enabled by default. During the audit mode, shadow stack functionality is enabled. Since shadow stack functionality is enabled for the application's binary, initiating execution also includes the task manager 116 creating (or initiating creation of) a shadow stack 114 for each of these one or more threads.

In a more particular example, FIG. 2A illustrates an example 200*a* that depicts a representation of an application binary 201. While binary formats vary from operating system to operating system, in general, a binary includes a header describing properties and layout of the binary, and a body that comprises application code and data (e.g., in the form a text segment, a data segment, etc.). Thus, in FIG. 2A, application binary 201 is shown as including a header 201*a* portion and a body 201*b* portion. In embodiments, as part of initiating execution of an application's binary (e.g., application binary 201), the task manager 116 reads the binary's header (e.g., header 201*a*) to obtain binary properties and layout, and loads at least a portion of the binary's body (e.g., body 201*b*) into system memory 103 (e.g., at least a portion of which could correspond to application code 110*a*). FIG. 2A shows the state after the task manager 116 has initiated execution of at least one thread for application binary 201, and after it created a call stack 203 and a shadow stack 204 corresponding to that initiated thread. It is noted that, in FIG. 2B, call stack 203 and shadow stack 204 "grow" downward; that is, new information is pushed onto the bottom of these stacks, such that the "top" item on the stack is visually shown at the bottom of the call stack 203 and the shadow stack 204.

FIG. 2A shows a state of call stack 203 and shadow stack 204 after the initiated thread has executed for at least some period of time. For example, call stack 203 is shown as including four stack frames 203a-203d that were created in connection with execution of code of application binary 201 (e.g., due to internal procedure calls within that binary), as well as two stack frames 203e-203f that were subsequently created in connection with execution of code of module 202 (e.g., due to application binary 201 calling a procedure within module 202, and due to module 202 calling an internal procedure). Each of these stack frames 203a-203f is illustrated as storing a corresponding return address (i.e., return address 205a for stack frame 203a, return address 205b for stack frame 203b, return address 205c for stack frame 203c, return address 205d for stack frame 203d, return address 205e for stack frame 203e, and return address 205f for stack frame 203f). Correspondingly, shadow stack 204 is shown as also storing these same return addresses 205, in the same order. Since the "stack" or return addresses on call stack 203 matches the "stack" of return addresses on shadow stack 204, as of FIG. 2A, there would be no shadow stack violations if stack frames 203a-203f were to be popped from the call stack 203.

Turning to FIG. 2B, the current "top" stack frame 203f on call stack 203 now contains a new return address (i.e., return address 205g), which differs from the "top" return address on shadow stack 204 (i.e., return address 205f). This new return address 205g could have been written to stack frame 203f due to a bug within module 202, due to intentional ROP behavior by module 202, or even due to a malicious attack targeting module 202. By operation of shadow stack logic or functionality (e.g., as part of a procedure epilogue and/or by shadow stack support 107 within processor(s) 102), a mismatch is detected between return address 205g and return address 205f. As a result, a shadow stack violation is detected (e.g., by procedure epilogue code and/or by shadow stack support 107), triggering a hardware or software exception (such as a control protection exception).

Returning to FIG. 4, in some embodiments, processing a shadow stack violation in the audit mode (act 430) includes replacing the return address in the shadow stack with the return address in the call stack (act 432). For example, in the audit mode, when the exception is triggered by a mismatch between a first return address 205g in a call stack 203 corresponding to a thread and a second address 205f in a shadow stack 204 corresponding to the same thread, the second return address 205f in the shadow stack 204 is replaced with the first return address 205g. As such, the violation is not enforced in the audit mode. However, telemetries associated with the exception may still be logged in the audit mode. In some embodiments, processing the exception in the audit mode (act 430) also includes logging at least one of (1) an identification of a process to which the thread belongs, (2) an identifier of the thread, or (3) an identifier of the application binary (act 436). In some embodiments, the application binary is a device driver. Examples of application binary identifiers include (but are not limited to) a file name, a hash of a particular portion of the binary, an embedded version metadata of the application binary, and/or a combination thereof.

As discussed above, although the replacing the mismatched entry in the shadow stack with the entry in the call stack can catch incompatibilities with kernel shadow stacks, this mechanism does not handle a shadow stack overflow. For example, when certain software programs, such as (but not limited to) certain games are running in the audit mode, they may continuously perform calls, pushing addresses onto both the call stack and the shadow stack. In some cases, the software program has instructions that manually check if the call stack is nearing its end to prevent the call stack from exceeding its allocated space. When the call stack is nearing its end, the application may manually start using an earlier portion of its own stack. In some cases, the application may not properly unwind the stack using standard methods, and therefore the shadow stack will continue to grow, causing the shadow stack to overflow. For example, rather than using a "ret" instruction, the software program may use a branch instruction to return to the caller of a function. In such a case, the corresponding return address on the shadow stack would not be popped, effectively "leaking" one shadow stack location each time, and shadow stack overflow may occur.

To solve the problem caused by shadow stack overflow, at least some embodiments described herein enable at least a portion of the shadow stack to be a circular stack in the audit mode (act 420), such that when usage of the shadow stack has reached a defined usage threshold, contents in at least a portion of the shadow stack are overwritten. In some embodiments, the method 400 further includes determining whether usage of the shadow stack has reached a defined usage threshold (act 422). In response to determining that the usage of the shadow stack has reached the defined usage threshold, one or more entries of the shadow stack are overwritten, preventing the shadow stack from overflowing a memory region allocated to the shadow stack (act 424). In some embodiments, a flag (e.g., a Boolean value) is set to indicate whether at least one entry of the shadow stack has been overwritten. When the flag indicates that at least one entry of the shadow stack has been overwritten, it is understood that at least a portion of the shadow stack is corrupted; thus, the data contained in at least the portion of the shadow stack is not usable for enforcement purposes.

In some embodiments, checking whether the shadow stack has reached the defined threshold is performed during processing of shadow stack violations. FIG. 5 illustrates a flowchart of an example of method 500 for checking whether the shadow stack has reached the defined threshold during processing of a shadow stack violation, which corresponds to the act 430 of processing shadow stack violation in audit mode in FIG. 4. As illustrated in FIG. 5, when a shadow stack violation is triggered by a mismatch between a first address in a call stack and a second address in a shadow stack, an exception is received (act 510). In response to receiving the exception and a second address in the shadow stack in the audit mode, the method 500 includes replacing the second return address in the shadow stack with the first return address (act 510). The method 500 also includes enabling at least a portion of the shadow stack to be a circular stack (act 530) and determining whether usage of the shadow stack has reached a defined usage threshold (act 540). In response to determining that the usage of the shadow stack has reached the defined usage threshold, one or more entries of the shadow stack is overwritten to prevent the shadow stack from overflowing a memory region allocated to the shadow stack (act 550). In some embodiments, regardless of whether the shadow stack is overwritten, telemetry data associated with the thread is logged (act 560). Such telemetry data includes (but is not limited to) (1) an identification of a process to which the thread belongs, (2) an identifier of the thread, and/or (3) an identifier of the application binary. In some embodiments, the application binary is a device driver. Examples of application binary identifiers include (but are not limited to) a file name, a hash of a particular portion of the binary, an embedded version metadata of the application binary, and/or a combination thereof.

In some embodiments, the shadow stack comprises a maximum number of spaces for entries of return addresses based on a size of the memory region allocated to the shadow stack. One or more entries of return addresses are entered in one or more spaces among the maximum number of sequential spaces until usage of the shadow stack has reached the defined usage threshold.

Figure 2D:
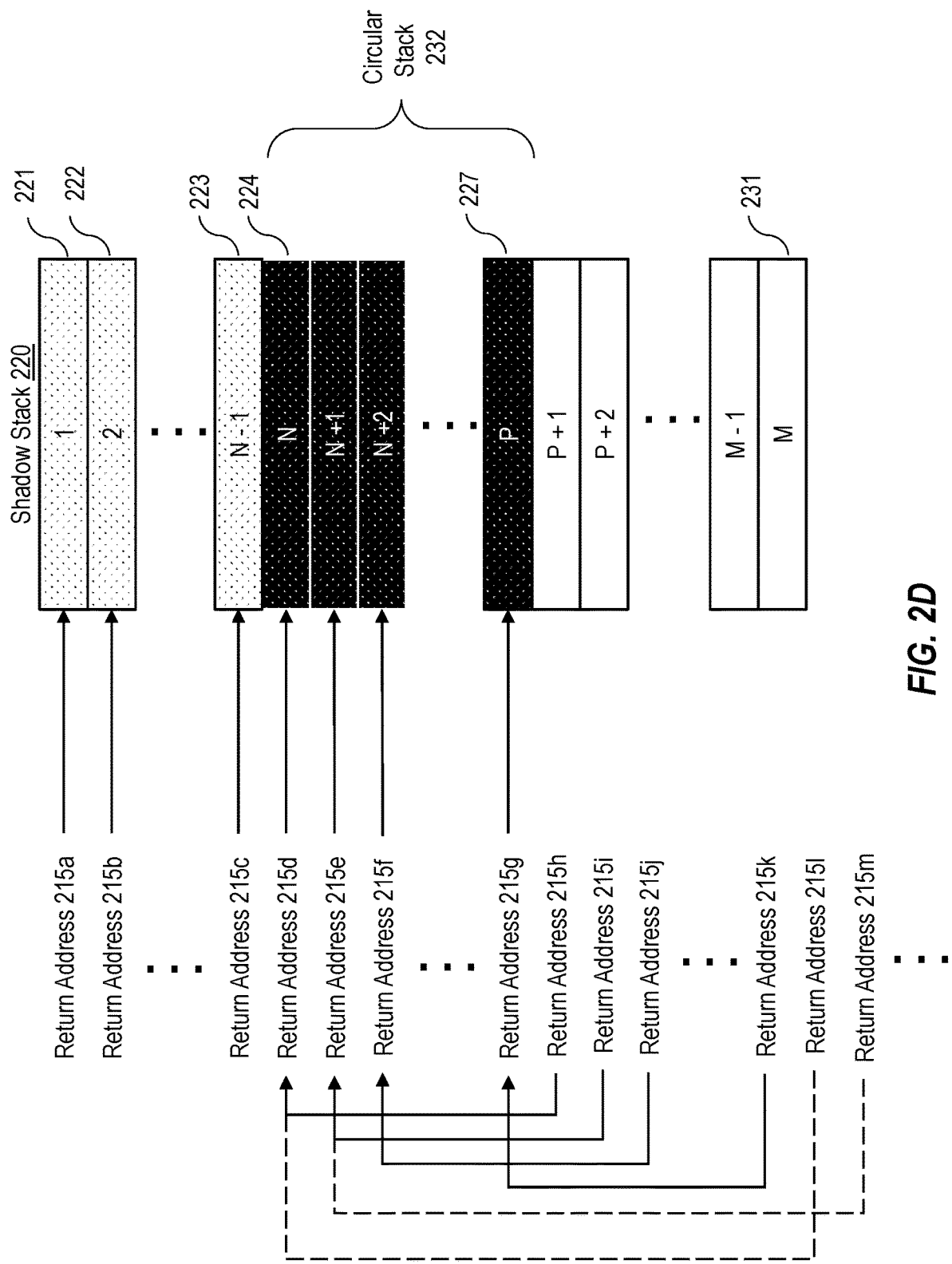
FIG. 2D illustrates an example shadow stack, a portion of which is enabled to be a circular stack in an audit mode.

FIG. 2D illustrates an example of a shadow stack 220 (e.g., which corresponds to the shadow stack 204 of FIGS. 2A-2C). A memory region is allocated to the shadow stack 220, which allows the shadow stack 220 to store a maximum number M of entries of return addresses, where M is a natural number. As illustrated, a first space 221 is shown at the top of the shadow stack 220, and a last space (i.e., a Mth space 231) is shown at the bottom of the shadow stack 220. As illustrated, the shadow stack 220 grows downward; that is, newly generated return addresses are pushed onto a lower side of the shadow stack 220. For example, a first generated return address 215a is stored at the first space 221, a second generated return address 215b is stored at the second space 222, the (N−1)th return address 215c is stored at the (N−1)th space 223, and so on and so forth.

In some embodiments, determining that usage of the shadow stack has reached the defined usage threshold comprises determining that a number of entries of return addresses in the shadow stack has reached (e.g., equal to or greater than) a predetermined limit (also referred to a "first predetermined limit"). For example, as illustrated, the first predetermined limit is P, where P is a natural number. When an entry of return address is stored in the Pth space 227 in the shadow stack 220, e.g., when the Pth space is filled in with return address 215g or 215k, it is determined that usage of the shadow stack 220 has reached the defined usage threshold.

In some embodiments, determining that usage of the shadow stack has reached the defined usage threshold comprises determining that a ratio between the number of entries of return addresses in the shadow stack and a maximum number M of spaces for entries in the shadow stack is greater than a predetermined limit (also referred to as a second predetermined limit). For example, in some embodiments, the second predetermined limit is 80%. If the maximum number M=512, P=80%×512≈409. As such, when an entry of the return address is stored in the $409^{th}$ space in the shadow stack 220, it is determined that the usage of the shadow stack has reached the defined usage threshold.

In some embodiments, determining that usage of the shadow stack has reached the defined usage threshold comprises determining that a number of available spaces among the maximum number M of spaces in the shadow stack 220 is lower than a predetermined limit (also referred to a "third predetermined limit"). For example, in some embodiments, the third predetermined limit=100. If the maximum number M=512, P=512−100=412. As such, when an entry of return addresses is stored in the $412^{th}$ space in the shadow stack 220, it is determined that the usage of the shadow stack has reached the defined usage threshold.

In some embodiments, an existing entry that is stored at a particular numbered space (e.g., N) is first to be overwritten, where N is a natural number, and N<P. For example, the (P+1)th return address 215h will be stored at an Nth space 224 where an existing entry 215d has been previously entered; the (P+2)th return address 215i will be stored at an (N+1)th space 225 where an existing entry 215e has been previously entered, and so on and so forth, until the Pth space is reached again. As illustrated, when the return address 215k overwrites the return address 215g in the Pth space, the usage of the shadow stack has reached the defined usage threshold again. In such a case, the circular stack 232 will circulate again, and one or more existing entries of return addresses in the circular stack 232 will be overwritten again by one or more new entries. For example, the return address 215l (following the return address 215k) will be stored in the Nth space again, overwriting the currently stored return address 215h in the Nth space; the return address 215m (following the return address 215l) will be stored in the (N+1)th space again, overwriting the currently stored return address 215i in the Nth space. This process may repeat, and the return addresses stored in the spaces between (and including) the Nth space and the Pth space may be overwritten as many times as necessary, such that the spaces between (and including) the Nth space and the Pth space forms a circular stack 232.

In some embodiments, an operating system of computer system is configured to enable at least a portion of the shadow stack to be a circular stack. In some embodiments, a CPU is configured to allow privileged instructions to directly set a next shadow stack location of an active shadow stack, setting it to N. In some embodiments, a CPU may be configured with a shadow stack end address, and generate an exception when pushing a value to the shadow stack would write to the end address. In some embodiments, a CPU may be configured with a shadow stack end address and a shadow stack circular start address. In such an embodiment, rather than cause an exception at shadow stack overflow, the CPU may set a flag (e.g., a Boolean value) to indicate whether at least one entry of the shadow stack has been overwritten, while still causing an exception on a shadow stack mismatch.

In some embodiments, the starting point N of the circular stack 232 and/or the ending point P of the circular stack 232 are predetermined numbers. In some embodiments, the starting point N of the circular stack 232 and/or the ending point P of the circular stack 232 are based on a ratio N/M of between the starting point N and the maximum space M of the shadow stack 220 and/or a ratio P/M of between the ending point P and the maximum space M of the shadow stack 220. In some embodiments, the starting point N and/or the ending point P may be randomly selected within a range of numbers.

As shown in FIG. 2D, the starting point N of the circular stack 232 may be any point in the shadow stack. In some embodiments, a beginning portion (from the first to the (N−1)th entry) is preserved, i.e. not overwritten. It is advantageous to preserve a beginning portion of the shadow stack 220 because the beginning portion might provide more useful information about what has happened.

In some embodiments, the third predetermined limit and/or the ending point P are determined based on a maximum number of entries of return addresses that can be simultaneously entered in the shadow stack when a particular event occurs. For example, when an intercept occurs, there may be up to 30 return addresses generated substantially simultaneously. Thus, to prevent shadow stack overflow from occurring, at least 30 spaces should be left after the ending point P of the circular stack 232, i.e., M-P>30. In some embodiments, out of an abundance of caution, about 100 spaces are left after the ending point P of the circular point, i.e., M-P>100; as such, it is almost certain that the shadow stack would never overflow. In some embodiments, statistical data may be gathered to determine the maximum number of return addresses that can be simultaneously entered in the shadow stack, and P is determined based on the gathered statistical data.

As long as the shadow stack does not overflow, the computer system can continue to gather and log telemetry data associated with the thread. Returning to FIG. 4 again, in some embodiments, in response to overwriting one or more currently used entries of the shadow stack, one or more telemetries associated with the thread is logged (act 426). In some embodiments, the one or more telemetries include (but are not limited to) (1) an identification of a process to which the thread belongs, (2) an identifier of the thread, and/or (3) an identifier of an application binary (act 426). In some embodiments, the application binary is a device driver. Examples of application binary identifiers include (but are not limited to) a file name, a hash of a particular portion of the binary, an embedded version metadata of the application binary, and/or a combination thereof.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A computer system comprising:
   a processor; and
   a computer-readable hardware storage device having stored thereon computer-executable instructions that are executable by the processor to configure the computer system to enable shadow stack functionality in an audit mode, the computer-executable instructions including instructions that are executable by the processor to configure the computer system to perform at least:
   initiate execution of a thread at the processor, the execution of the thread including:
      initiating execution of executable code of an application binary as part of the thread; and
      enabling shadow stack functionality for the thread in the audit mode;
   based at least on the execution of the thread at the processor in the audit mode, enable at least a portion of a shadow stack as a circular stack;
   process an exception triggered by a mismatch between a first return address in a call stack corresponding to the thread and a second return address in a shadow stack corresponding to the thread, including replacing the second return address stored in the shadow stack with the first return address, such that a violation caused by the mismatch is not enforced;
   determine that usage of the shadow stack has reached a defined usage threshold;
   overwrite a currently used entry of the shadow stack, based on determining that usage of the shadow stack has reached the defined usage threshold, preventing the shadow stack from overflowing a memory region allocated to the shadow stack; and
   prevent shadow stack enforcement for the thread based on the currently used entry being overwritten on the shadow stack.

2. The computer system of claim 1, wherein determining whether usage of the shadow stack has reached the defined usage threshold is performed in response to detecting a shadow stack violation triggered by a mismatch between a first address in a call stack and a second address in the shadow stack that corresponds to the first address.

3. The computer system of claim 1, wherein in response to overwriting one or more currently used entries of the shadow stack, the computer system is further configured to log one or more telemetries associated with the thread.

4. The computer system of claim 3, wherein the one or more telemetries associated with the thread include at least one of:
   an identifier of a process to which the thread belongs,
   an identifier of the thread,
   an identifier of an application binary associated with the thread.

5. The computer system of claim 1, wherein the computer system is further configured to:
   initiate execution of a second thread at the processor, the execution of the second thread including:
      initiating execution of executable code of the application binary as part of the thread;
      enabling shadow stack functionality for the thread in an enforcement mode; and
      refraining from enabling any portion of the shadow stack to be a circular stack.

6. The computer system of claim 1, wherein enabling the shadow stack to be a circular stack further includes determining that the audit mode is enabled prior to enabling at least a portion of the shadow stack to be a circular stack.

7. The computer system of claim 1, wherein the shadow stack comprises a maximum number of spaces for entries based on a size of the memory region allocated to the shadow stack, and one or more entries of return addresses are entered in one or more sequential spaces among the maximum number of spaces until usage of the shadow stack has reached the defined usage threshold.

8. The computer system of claim 6, wherein determining that usage of the shadow stack has reached the defined usage threshold comprises determining that a first number of entries of return addresses in the shadow stack has reached a first predetermined limit.

9. The computer system of claim 7, wherein determining that usage of the shadow stack has reached the defined usage threshold comprises determining that a ratio between a first number of entries of return addresses in the shadow stack and the maximum number of spaces for entries is greater than a second predetermined limit.

10. The computer system of claim 7, wherein determining that usage of the shadow stack has reached the defined usage threshold comprises determining that a second number of available spaces among the maximum number of spaces in the shadow stack is lower than a third predetermined limit.

11. The computer system of claim 10, wherein the third predetermined limit is determined based on a maximum number of entries of return addresses that can be simultaneously entered in the shadow stack when a particular event occurs.

12. The computer system of claim 7, wherein overwriting one or more currently used entries of return addresses in the shadow stack comprises overwriting an existing entry with a new entry, the existing entry being stored at a third numbered space among the maximum number of spaces in the shadow stack.

13. The computer system of claim 12, wherein overwriting one or more currently used entries of return addresses in the shadow stack comprises overwriting one or more existing entries of return addresses with one or more new entries of return addresses, the one or more existing entries being stored at one or more sequential spaces, starting from the third numbered space up to a fourth numbered space among the maximum number of spaces in the shadow stack, where a fourth number corresponding to the fourth numbered space is greater than a third number corresponding to the third numbered space.

14. The computer system of claim 12, wherein a ratio between a third number corresponding to the third numbered space and the maximum number of spaces is a predetermined ratio.

15. The computer system of claim 1, wherein processing the exception in the audit mode comprises logging one or more telemetries associated with the thread.

16. A method, implemented at a computer system that includes a processor, for enabling at least a portion of a shadow stack to be a circular stack an audit mode, the method comprising:
    initiating execution of a thread at the processor, the execution of the thread including:
        initiating execution of executable code of an application binary as part of the thread; and
        enabling shadow stack functionality for the thread in the audit mode;
    based at least on the execution of the thread at the processor in the audit mode, enabling at least a portion of a shadow stack as a circular stack;
    processing an exception triggered by a mismatch between a first return address in a call stack corresponding to the thread and a second return address in a shadow stack corresponding to the thread, including replacing the second return address stored in the shadow stack with the first return address, such that a violation caused by the mismatch is not enforced;
    determining that usage of the shadow stack has reached a defined usage threshold;
    overwriting a currently used entry of the shadow stack, based on determining that usage of the shadow stack has reached the defined usage threshold, preventing the shadow stack from overflowing a memory region allocated to the shadow stack; and
    preventing shadow stack enforcement for the thread based on the currently used entry being overwritten on the shadow stack.

17. The method of claim 16, wherein determining whether usage of the shadow stack has reached the defined usage threshold is performed in response to detecting a shadow stack violation triggered by a mismatch between a first address in a call stack and a second address in the shadow stack that corresponds to the first address.

18. The method of claim 16, wherein in response to overwriting one or more currently used entries of the shadow stack, the method comprises logging one or more telemetries, the one or more telemetries including at least one of,
    an identifier of a process to which the thread belongs,
    an identifier of the thread, or
    an identifier of the application binary.

19. A computer program product comprising a hardware storage device having stored thereon computer-executable instructions that are structured such that, when executed by one or more processors of a computer system, the computer-executable instructions configure the computer system to perform at least:
    initiate execution of a thread at the one or more processors, the execution of the thread including:
        initiating execution of executable code of an application binary as part of the thread; and
        enabling shadow stack functionality for the thread in an audit mode;
    based at least on the execution of the thread at the one or more processors in the audit mode, enable at least a portion of a shadow stack as a circular stack;
    process an exception triggered by a mismatch between a first return address in a call stack corresponding to the thread and a second return address in a shadow stack corresponding to the thread, including replacing the second return address stored in the shadow stack with the first return address, such that a violation caused by the mismatch is not enforced;
    determine whether usage of the shadow stack has reached a defined usage threshold;
    overwrite a currently used entry of the shadow stack, based on determining that usage of the shadow stack has reached the defined usage threshold, preventing the shadow stack from overflowing a memory region allocated to the shadow stack; and
    prevent shadow stack enforcement for the thread based on the currently used entry being overwritten on the shadow stack.

* * * * *